United States Patent
Danielson et al.

(10) Patent No.: US 9,836,377 B1
(45) Date of Patent: Dec. 5, 2017

(54) PROFILING APPLICATION PERFORMANCE DATA

(71) Applicants: Debra J Danielson, Skillman, NJ (US);
Kenneth Blackwell, Redding, CT (US)

(72) Inventors: Debra J Danielson, Skillman, NJ (US);
Kenneth Blackwell, Redding, CT (US)

(73) Assignee: CA, Inc., New York, NY (US)

( * ) Notice: Subject to any disclaimer, the term of this patent is extended or adjusted under 35 U.S.C. 154(b) by 783 days.

(21) Appl. No.: 14/030,473

(22) Filed: Sep. 18, 2013

(51) Int. Cl.
*G06F 11/34* (2006.01)
*G06Q 30/02* (2012.01)

(52) U.S. Cl.
CPC ..... *G06F 11/3409* (2013.01); *G06Q 30/0201* (2013.01); *G06Q 30/0202* (2013.01); *G06Q 30/0203* (2013.01)

(58) Field of Classification Search
None
See application file for complete search history.

(56) References Cited

U.S. PATENT DOCUMENTS

| | | | | |
|---|---|---|---|---|
| 6,990,437 B1* | 1/2006 | Abu El Ata | ........... | G06Q 10/04 703/2 |
| 2002/0091817 A1* | 7/2002 | Hill | ..................... | G06F 11/3419 709/224 |
| 2004/0181670 A1* | 9/2004 | Thune | ................. | G06F 21/6263 713/176 |
| 2005/0080696 A1* | 4/2005 | Bagchi | .................. | G06Q 40/00 705/35 |
| 2005/0120341 A1* | 6/2005 | Blumenthal | ........ | G06F 11/3428 717/158 |
| 2008/0294583 A1* | 11/2008 | Hunt | .................. | G06Q 20/0855 706/46 |
| 2010/0312737 A1* | 12/2010 | Coldicott | .......... | G06F 17/30289 706/45 |

(Continued)

OTHER PUBLICATIONS

Compuware, 2013 State of the Art and Trends, 2013, pp. 7, 13-15.

*Primary Examiner* — Lewis A Bullock, Jr.
*Assistant Examiner* — Bruce S Ashley
(74) *Attorney, Agent, or Firm* — Baker Botts L.L.P.

(57) ABSTRACT

A method includes receiving respective statistics for a plurality of infrastructure implementations. Each infrastructure implementation includes a respective organization and a respective deployment architecture. The method also includes determining a selected infrastructure implementation of the plurality of infrastructure implementations. The method further includes determining, using a processor, first particular implementations comparable to the selected infrastructure implementations from the plurality of infrastructure implementations, based on characteristics of the respective organization of the selected infrastructure implementation. The method additionally includes determining comparison metrics. The determining comparison metrics includes anonymizing the respective organization of each of the first particular implementations, and aggregating the respective statistics of each of the anonymized first particular implementations into comparison statistics. The comparison metrics include the comparison statistics, each respective deployment architecture of each of the first particular implementations, and the selected infrastructure implementation.

17 Claims, 2 Drawing Sheets

(56) References Cited

U.S. PATENT DOCUMENTS

| | | | |
|---|---|---|---|
| 2011/0125895 A1* | 5/2011 | Anderson | H04L 9/3213 709/224 |
| 2011/0145094 A1* | 6/2011 | Dawson | G06F 9/5027 705/26.63 |
| 2011/0251874 A1* | 10/2011 | Banthia | G06Q 30/02 705/7.31 |
| 2011/0265064 A1* | 10/2011 | Hadar | G06F 17/30985 717/121 |
| 2014/0229607 A1* | 8/2014 | Jung | H04L 43/0876 709/224 |

* cited by examiner

PROFILING APPLICATION PERFORMANCE DATA

BACKGROUND

The disclosure relates generally to application performance management, and more specifically to a system and method for profiling application performance data.

SUMMARY

According to one embodiment of the disclosure, a method includes receiving respective statistics for a plurality of infrastructure implementations. Each infrastructure implementation includes a respective organization and a respective deployment architecture. The method also includes determining a selected infrastructure implementation of the plurality of infrastructure implementations. The method further includes determining, using a processor, first particular implementations comparable to the selected infrastructure implementations from the plurality of infrastructure implementations, based on characteristics of the respective organization of the selected infrastructure implementation. The method additionally includes determining comparison metrics. The determining comparison metrics includes anonymizing the respective organization of each of the first particular implementations, and aggregating the respective statistics of each of the anonymized first particular implementations into comparison statistics. The comparison metrics include the comparison statistics, each respective deployment architecture of each of the first particular implementations, and the selected infrastructure implementation. The method still further includes formatting for display selected metrics of the comparison metrics.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
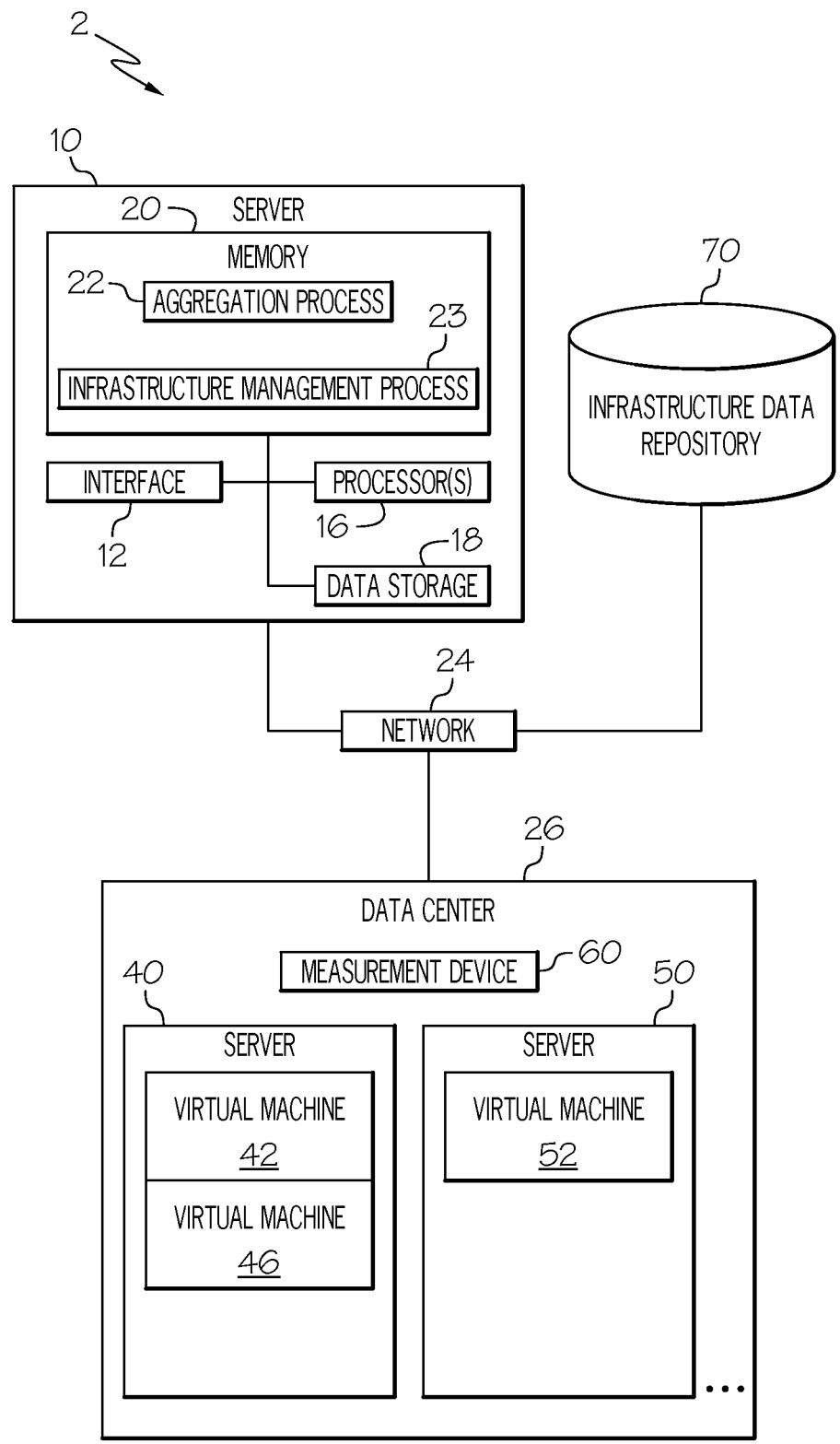
FIG. 1 illustrates a block diagram of a system for profiling application performance data in accordance with a particular embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

With reference to FIG. 1, a system 2 for profiling application performance data is illustrated in accordance with one particular embodiment of the present disclosure. While reference is made to the elements of FIG. 1, the embodiments described herein may be configured in any type of computer, server, distributed computing network, network, cluster of servers, data center, or in any other configuration of computing resources. In this example, an infrastructure management process 23 on server 10 tracks performance metrics and deployment architectures of an organization. The organization hosts a variety of internal and external facing applications on data center 26. Infrastructure management process 23 stores the organization's deployment architectures and application metrics including performance metrics and usage/traffic information. This data is stored in an infrastructure data repository 70. Infrastructure management process 23 further provides a user interface for organizations to view, sort, browse, analyze, and download performance metrics. Infrastructure management process 23 provides this functionality for many organizations across many industries.

Organizations may wish to gain more information about their implementations by comparing their infrastructure implementation to those of other related organizations. Aggregation process 22 works with infrastructure management process 23 to aggregate, generalize, anonymize and display comparative data and recommendations on deployment and configuration settings that may optimize performance in accordance with what the organization's peers are using. Aggregation process 22 queries infrastructure data repository 70 for comparative data based on relevant parameters, and finds comparable infrastructure implementations. For example, relevant parameters may include industry, geography, company size, company type, consumer base, financial sophistication, maturity, and/or any other attributes. Infrastructure management process 23 continues to receive statistics and performance metrics from organizations, while aggregation process 22 determines comparison metrics based on the comparable infrastructure implementations. Infrastructure management process 23 displays the resulting comparison metrics for the organization to review.

The teachings of the present disclosure enable Information Technology ("IT") managers and staff to undertake an in-depth analysis of monitored applications and compare these results with other similar applications. In certain embodiments, the teachings of the present disclosure provide for retrieval of performance data across one or more relevant parameters and comparison of that performance data with the organization's deployment architecture.

In certain embodiments, an infrastructure management provider provides an application for monitoring application and infrastructure performance for enterprise applications. The infrastructure management provider has access to performance and architecture data for a large number of organizations across many industries. After use of performance data is approved by the data owner (i.e., the organization) the data can be easily aggregated and generalized because of the centralized environment that the data is stored in.

In still other embodiments, the performance data is related to the service model across organizations in an industry. The teachings of the present disclosure enable aggregation of data and profiling of the performance characteristics of whole industries, not just single organizations. Such insights may be valuable to organizations in understanding how their IT operations stack-up compared to their industry peers.

System 2 further includes infrastructure data repository 70. Infrastructure data repository 70 includes a hard disk drive, database server, shared drive, or any other mass storage device configured to store data. In still other embodiments, infrastructure data repository 70 is physically located in data center 26, or anywhere on network 24 that is accessible to aggregation process 22 and infrastructure management process 23.

Data center 26 includes any facility used to house computer systems and associated components, such as telecommunications and storage systems. Those of ordinary skill in the art should understand the present disclosure to enumerate only several example methods of hosting the components of system 2. Many additional system configurations may be profiled in accordance with the teachings of the present disclosure. For example, some deployment architectures employ many data centers. Alternatively, some deployment architectures use no data centers and instead use only a few physical servers. As a further example, a cloud infrastructure may be used to host an organization's applications. The teachings of the present disclosure may be applied in each of the enumerated deployment configurations, as well as any other system configuration.

In certain embodiments, data center 26 includes measurement device 60. Measurement device 60 may be implemented in hardware and/or software, and may be proprietary, open source, and/or built in-house. In conjunction with infrastructure management process 23, measurement device 60 measures performance metrics using, for example, counters and gauges to measure and store performance measurements into infrastructure data repository 70. For example, measurement device 60 counts the number of incoming packets to determine the bandwidth utilization or throughput of a certain system. In other examples, a gauge measurement device 60 measures central processing unit ("CPU") optimization statistics and stores the results in infrastructure data repository 70 in conjunction with infrastructure management process 23.

Measurement device 60 measures activity on servers 40 and 50, and virtual machines 42, 46, and 52. These virtual machines are used in supporting hosted applications. For example, an organization hosts a customer relationship management ("CRM") application using data center 26 and the servers and virtual machines therein. Measurement device 60 accounts for the CPU activity and memory utilization on virtual machines 42, 46, and 52, as well as for the many other virtual machines hosted in data center 26. These statistics are then stored in infrastructure data repository 70. An IT manager uses infrastructure management process 23's web interface to analyze the performance data for data center 26.

In certain embodiments, components from system 2 run on multiple computers concurrently in the frame of a parallel processing enabled technology, e.g., Apache Hadoop®, or other MapReduce implementations. In this case, the data collected and/or received from each component in data center 26 may be distributed in the proximity of the computer being used to analyze it.

In certain embodiments, comparison metrics include industry, market, and/or geographic characteristics of the infrastructure implementation.

Figure 2:
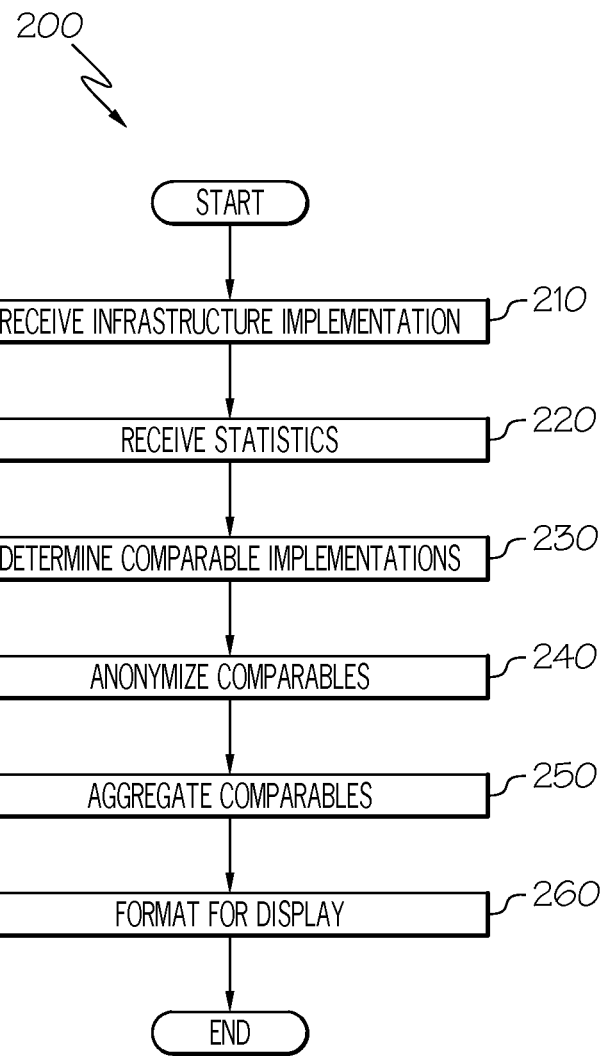
FIG. 2 illustrates a flowchart of a method for profiling application performance data in accordance with another embodiment.

With reference to FIG. 2, a flowchart of a method 200 for profiling application performance data is disclosed in accordance with another embodiment of the present disclosure. At step 210, data describing the infrastructure implementations of a variety of comparable systems is received. In certain embodiments, the systems may each be associated with a particular attribute of interest to the user. In some embodiments, information regarding systems across many industries is received. In other embodiments, the infrastructure implementations are associated with one or more industries, and may be compared accordingly. For example, an organization for booking hotel accommodations also allows users to book flights. For the purposes of the present disclosure, such an organization can be classified as part of the hotel and airline industries.

In certain embodiments, comparable systems may be grouped by other characteristics. For example, a grocery store with a sophisticated online presence may want to compare their infrastructure implementation to organizations with comparable technical infrastructure resources. Competitors in the grocery industry may not have such resources, and thus comparison against those organizations may not be useful.

In certain embodiments, an infrastructure implementation includes data about applications, infrastructure architecture and/or configurations for each of the systems. For example, an infrastructure implementation may include details about the number of servers, memory and processing capacity of those servers, networks, databases, applications, and the configuration of all of these components.

An infrastructure implementation includes deployment architecture configuration details. For example, an organization using WINDOWS® servers running the MICROSOFT .NET® framework would have such information reflected in their deployment architecture, as well as the configuration of their servers. The physical brand and specifications of the servers would also be reflected in the deployment architecture. Similarly, a JAVA® configuration could be specified where appropriate. In certain embodiments, this information can be discovered directly from the respective systems, or may be extracted from a configuration management database.

The infrastructure implementation is also associated with a system or organization competing in a particular market. The infrastructure implementation contains information regarding the hosting organization and their associated industries, as well as details associated with the applications each particular infrastructure implementation is hosting. In some embodiments, large corporations will have several infrastructure implementations for each area of their business such as CRM repositories, client facing web pages for e-commerce transactions, and intranet web-portals for collaboration.

Infrastructure implementations also include performance information such as, for example, CPU utilization, memory utilization and capacity, disk input/output ("disk I/O") time, network throughput, and bandwidth.

Infrastructure implementations also include information regarding site or application traffic. Such information includes, for example, the number of hits a web page receives per minute, or the number of users of a hosted application at a particular time of day.

Comparable systems are meant to refer to systems associated with organizations that are somehow related. Another organization may gain valuable information regarding their IT infrastructure by comparison with those comparable systems. Those competing in the same market may require such information regarding competitors to make sure the services they offer are competitive. If services are found to be less efficient by comparison than those services offered by other systems, then valuable deployment architecture or configuration information can be used to tweak and/or optimize their architecture to match or exceed a more efficient configuration.

In certain embodiments, inefficient application configurations are discovered. IT management may determine the proper course of action to take regarding the determined inefficiencies. For example, an IT manager may add capacity, increase bandwidth, and/or re-configure resources to better service the sub-optimal application. As another example, the IT manager may determine no feasible options for remedying the inefficient application exist within budget or scope of the project. Thus, certain embodiments of the present disclosure enable the IT manager to determine if any "low hanging fruit" exists to remedy optimization problems.

Method 200 also includes a selected infrastructure implementation. The selected infrastructure implementation is determined based on the infrastructure implementation that the user is associated with. For example, a user logs into the infrastructure management system under an account A. Account A is configured for infrastructure management services, and has those services administered by infrastructure management process 23 from FIG. 1. In this embodiment, the infrastructure implementation to which Account A is registered is the selected infrastructure implementation. Other methods of selecting infrastructure implementations are enabled in separate embodiments of the present disclosure.

Each of the infrastructure implementations may be associated by different attributes. For example, an organization wants to compare its infrastructure implementation with other organization's architectures based on selected attributes. In the above example, account A is registered with the infrastructure management system as a part of the hotel reservation industry. In such an example, infrastructure implementations for systems including those with online reservation and booking services are received. Each of the infrastructure implementations is also associated with a deployment architecture that details the deployment details of each respective organization's specific architecture. These details are generalized in order to make comparisons among similar architectures without revealing the actual organization implementing the described architecture. For example, infrastructure implementations with relatively similar deployment architectures may be treated as equivalent for aggregation and reporting purposes. In another example, as part of anonymizing the comparable implementations, the deployment architectures are generalized such that specific architecture details are scrubbed from the comparable deployment architectures.

In certain embodiments metrics received from individual infrastructure implementations are normalized such that they may be compared. For example, data is received regarding two heterogeneous infrastructure implementations. The data may not be compared directly because of incompatibilities between the two implementations. In certain embodiments of the present disclosure, the data received may be normalized such that an accurate comparison may be made between heterogeneous infrastructure implementations.

In another example, account B is registered under the hotel reservation industry and the travel service industry. In this example, the user may be presented with an interface to select between the two industries to find comparable infrastructure implementations. In another example, a user indicates a preference to search both industries for comparable infrastructure implementations.

At step 220, statistics for the infrastructure implementations are received. The statistics may include one or more of traffic, performance, reliability, and cost statistics. In certain embodiments, energy consumption statistics are also received. Many other statistics, metrics, implementation details, and organizational attributes may be collected and utilized. In certain embodiments, the data for these statistics comes from infrastructure data repository 70 via measurement device 60 and many other measurement devices spread throughout data center 26.

Traffic statistics include metrics measuring, for example, the number of hits a web page receives. In another embodiment, the traffic statistics include the number of user sessions actively using an application. Such statistics are generally tracked with respect to time, and indicate when applications are most used.

Performance statistics include measuring CPU, memory, network throughput, or hard disk I/O time. Such metrics give a general sense of utilization and resource consumption on a system. Performance statistics may also measure the resources available that are unused. These statistics give a good hint into what applications are the most resource intensive so that additional resources can be scaled up to meet the increased resource demand.

In particular embodiments, reliability statistics include data representing the number of total timeouts, disconnects, or crashes for a given application. In certain embodiments, reliability statistics may include cart abandons and/or timeouts. Certain embodiments of the present disclosure may facilitate a comparison of reliability statistics across different application implementations. Cost statistics include the cost to run (i.e., energy costs, building costs), maintain, and service an infrastructure implementation. Energy consumption statistics include environmental considerations such as power consumption required to cool and power application resources. Such statistics may also take into account a cost of operation for resources that are unused.

At step 230, comparable implementations are determined from the infrastructure implementations. The selected infrastructure implementation is used to determine other infrastructure implementations associated with the industry in question. In the present embodiment, the selected infrastructure implementation is determined based on the infrastructure management application user's infrastructure implementation.

Comparable implementations are determined based on the similarity of each infrastructure implementation's traffic statistics with the selected infrastructure implementation's traffic statistics. For example, application implementations servicing between 300 and 1000 users per day are considered comparable implementations for purposes of being compared with a selected infrastructure implementation servicing 500 application users. Those of ordinary skill in the art will understand that other broader or narrower constraints may be created to identify comparable infrastructure implementations. In certain embodiments, a user interface may allow the user to specify the traffic statistic constraints used to identify comparable infrastructure implementations.

At step 240, comparable implementations are anonymized. Anonymizing includes scrubbing comparable implementations in order to remove all identifiable information for each organization. For example, infrastructure implementations include organization information such as the name of the organization, the names of other industries the organization is associated with, and their deployment architecture. This includes detailed information such as the number of servers they use and how each is configured. This type of identifying information is scrubbed to protect proprietary data and the source of the comparable data.

If this information is not removed, then secret company information may be acquired from analyzing the infrastructure implementations, giving competitors an unfair advantage in the market. For example, an organization pays an IT consulting group millions of dollars to structure and configure their data centers and applications. If identifiable information is not scrubbed from the infrastructure implementation, competitors can copy their competitors' configurations without paying for the IT consulting services. The result may be that no competitors will share information for fear of revealing architecture innovations. One of the attributes of the present disclosure is to enable organizations to share their information while learning from others, and thus move the industry forward without fear of having secret implementation details stolen.

At step 250, comparable implementation statistics are aggregated to create comparison metrics. The comparison metrics include the comparable implementation statistics and comparable implementation deployment architectures. This data is compared with the selected infrastructure implementation statistics and deployment architecture.

At step 260, the comparison metrics are formatted for display. For example, a user logs in to the web interface to track an organization's infrastructure performance metrics. The user is presented with the organization's infrastructure performance metrics, as well as the comparison metrics. The comparison metrics display may rank the user's organization against the related organizations. The comparison metrics display also describes more popular general deployment architectures. The comparison metrics do not indicate which organizations are used in the comparison data.

In another embodiment, system 2 identifies performance weaknesses in an organization based on comparable implementations. For example, an organization's performance statistics may be below average among their peers. In this example, the infrastructure management application identifies areas in the organization's infrastructure where optimization may bring the organization in line with performance leaders. The infrastructure management application may allow IT managers to optimize these areas by providing a variety of actions, such as adding more servers, or load balancing available servers differently to achieve better performance. Other example comparisons include using other statistical comparisons to generate comparisons on one or more of energy consumption, performance, and reliability, as well as other general IT concerns.

In other embodiments that aggregate the performance data and present only the aggregates back to subscribing organizations, the comparable organization's identity is disguised so as not to expose sensitive operational metrics during comparisons.

Those of ordinary skill in the art will understand that the teachings of the present disclosure are not limited only to application data. Rather, the present disclosure may be applied across IT management domains.

According to one embodiment, system 2 classifies each system's organization by attribute (e.g., retail banking, manufacturing, construction, or healthcare). System 2 extracts data from each system and scrubs the data to remove any participant identification and then aggregates metrics across organizations. In certain embodiments, subscription capabilities in a web portal facilitate displaying organization aggregate data, side-by-side with organization specific metrics. For example, a dashboard shows a website response time alongside norms so the organization can quickly compare their performance to related organizations.

By aggregating performance and service model information across organizations, comparisons to related organization norms alongside performance metrics can be displayed. Combining performance data with service model characteristics allows users to draw insights by relating IT performance with application deployment architectures. For example, the teachings of the present disclosure enable an organization using SAP to compare their performance with other deployment architectures from similar organizations to determine where performance is lagging.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   determining, by an infrastructure management process, a configuration of hosted applications in a deployment architecture for a selected infrastructure implementation that is provided for a particular organization associated with a particular industry;
   determining, by the infrastructure management process, first particular implementations comparable to the selected infrastructure implementation based on whether each implementation hosts the same applications as the configuration of hosted applications for the selected infrastructure implementation;
   determining, by the infrastructure management process, second particular implementations provided for organizations that are associated with the particular industry, wherein the first and second particular implementations are selected from a plurality of infrastructure implementations deployed for respective organizations in a cloud environment;
   anonymizing, by the infrastructure management process, the respective organization for each of the first and second particular implementations;
   aggregating, by the infrastructure management process, performance statistics for each of the anonymized first and second particular implementations for comparison with the selected infrastructure implementation, wherein the performance statistics describe resource utilization of each first and second particular implementation while deployed;
   determining, by the infrastructure management process, a performance deficiency for the selected infrastructure implementation by comparing (1) performance statistics for the selected infrastructure implementation, (2) the aggregated performance statistics for the first particular implementations, and (3) the aggregated performance statistics for the second particular implementations, and
   performing, by the infrastructure management process, at least one resource management action to address the performance deficiency based on the performance deficiency.

2. The method of claim 1, wherein each of the respective organizations of the first particular implementations is associated with one of a plurality of industries; and wherein the characteristics of the respective organization of the selected infrastructure implementation comprise the respective associated industry.

3. The method of claim 1, wherein the respective statistics for the plurality of infrastructure implementations comprise:
performance statistics; and
reliability statistics.

4. The method of claim 1, further comprising:
determining a ranking of the selected infrastructure implementation based on a comparison of the respective statistics of each of the first particular implementations and the selected infrastructure implementation statistics.

5. The method of claim 1, wherein the respective statistics for the plurality of infrastructure implementations comprise energy consumption statistics.

6. The method of claim 1, wherein determining first particular implementations comparable to the selected infrastructure implementation further comprises:
determining a market segment associated with the respective organization for the selected infrastructure implementation; and
determining comparable infrastructure implementations based on the market segment, wherein the first particular implementations include the comparable infrastructure implementations.

7. A computer configured to access a storage device, the computer comprising:
a processor; and
a non-transitory, computer-readable storage medium storing computer-readable instructions that when executed by the processor cause the computer to perform:
determining, by an infrastructure management process, a configuration of hosted applications in a deployment architecture for a selected infrastructure implementation that is provided for a particular organization associated with a particular industry;
determining, by the infrastructure management process, first particular implementations comparable to the selected infrastructure implementation based on whether each implementation hosts the same applications as the configuration of hosted applications for the selected infrastructure implementation;
determining, by the infrastructure management process, second particular implementations provided for organizations that are associated with the particular industry, wherein the first and second particular implementations are selected from a plurality of infrastructure implementations deployed for respective organizations in a cloud environment;
anonymizing, by the infrastructure management process, the respective organization for each of the first and second particular implementations;
aggregating, by the infrastructure management process, performance statistics for each of the anonymized first and second particular implementations for comparison with the selected infrastructure implementation, wherein the performance statistics describe resource utilization of each first and second particular implementation while deployed;
determining, by the infrastructure management process, a performance deficiency for the selected infrastructure implementation by comparing (1) performance statistics for the selected infrastructure implementation, (2) the aggregated performance statistics for the first particular implementations, and (3) the aggregated performance statistics for the second particular implementations, and
performing, by the infrastructure management process, at least one resource management action to address the performance deficiency based on the performance deficiency.

8. The computer of claim 7, wherein each of the respective organizations of the first particular implementations is associated with one of a plurality of industries; and wherein the characteristics of the respective organization of the selected infrastructure implementation comprise the respective associated industry.

9. The computer of claim 7, wherein the respective statistics for the plurality of infrastructure implementations comprise:
performance statistics; and
reliability statistics.

10. The computer of claim 7, wherein the computer-readable instructions further cause the computer to perform:
determining a ranking of the selected infrastructure implementation based on a comparison of the respective statistics of each of the first particular implementations and the selected infrastructure implementation statistics.

11. The computer of claim 7, wherein the respective statistics for the plurality of infrastructure implementations comprise energy consumption statistics.

12. The computer of claim 7, wherein determining first particular implementations comparable to the selected infrastructure implementation further comprises:
determining a market segment associated with the respective organization for the selected infrastructure implementation; and
determining comparable infrastructure implementations based on the market segment, wherein the first particular implementations include the comparable infrastructure implementations.

13. A computer program product, comprising:
a non-transitory computer-readable storage medium having computer-readable program code embodied therewith, the computer-readable program code being operable, when executed, to:
determine, by an infrastructure management process, a configuration of hosted applications in a deployment architecture for a selected infrastructure implementation that is provided for a particular organization associated with a particular industry;
determine, by the infrastructure management process, first particular implementations comparable to the selected infrastructure implementation based on whether each implementation hosts the same applications as the configuration of hosted applications for the selected infrastructure implementation;
determine, by the infrastructure management process, second particular implementations provided for organizations that are associated with the particular industry, wherein the first and second particular implementations are selected from a plurality of infrastructure implementations deployed for respective organizations in a cloud environment;
anonymize, by the infrastructure management process, the respective organization for each of the first and second particular implementations;
aggregate, by the infrastructure management process, performance statistics for each of the anonymized first and second particular implementations for comparison with the selected infrastructure implementation, wherein the performance statistics describe resource utilization of each first and second particular implementation while deployed;

determine, by the infrastructure management process, a performance deficiency for the selected infrastructure implementation by comparing (1) performance statistics for the selected infrastructure implementation, (2) the aggregated performance statistics for the first particular implementations, and (3) the aggregated performance statistics for the second particular implementations, and perform, by the infrastructure management process, at least one resource management action to address the performance deficiency based on the performance deficiency.

14. The computer program product of claim 13, wherein each of the respective organizations of the first particular implementations is associated with one of a plurality of industries; and wherein the characteristics of the respective organization of the selected infrastructure implementation comprise the respective associated industry.

15. The computer program product of claim 13, wherein the respective statistics for the plurality of infrastructure implementations comprise:
performance statistics; and
reliability statistics.

16. The computer program product of claim 13, wherein the computer-readable program code further comprises:
computer-readable program code configured to determine a ranking of the selected infrastructure implementation based on a comparison of the respective statistics of each of the first particular implementations and the selected infrastructure implementation statistics.

17. The computer program product of claim 13, wherein the respective statistics for the plurality of infrastructure implementations comprise energy consumption statistics.

* * * * *